(12) United States Patent
You et al.

(10) Patent No.: US 9,955,390 B2
(45) Date of Patent: Apr. 24, 2018

(54) TRANSMISSION AND RECEPTION METHOD OF MTC DEVICE

(71) Applicant: LG ELECTRONICS INC., Seoul (KR)

(72) Inventors: Hyangsun You, Seoul (KR); Yunjung Yi, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 14/892,116

(22) PCT Filed: May 14, 2014

(86) PCT No.: PCT/KR2014/004316
§ 371 (c)(1),
(2) Date: Nov. 18, 2015

(87) PCT Pub. No.: WO2014/189227
PCT Pub. Date: Nov. 27, 2014

(65) Prior Publication Data
US 2016/0112914 A1    Apr. 21, 2016

Related U.S. Application Data

(60) Provisional application No. 61/826,031, filed on May 22, 2013.

(51) Int. Cl.
*H04W 36/04* (2009.01)
*H04L 5/00* (2006.01)
(Continued)

(52) U.S. Cl.
CPC ............. *H04W 36/04* (2013.01); *H04L 5/001* (2013.01); *H04L 5/0053* (2013.01);
(Continued)

(58) Field of Classification Search
CPC . H04W 36/0016; H04W 36/08; H04W 36/14; H04W 36/0061; H04W 36/0094;
(Continued)

(56) References Cited

U.S. PATENT DOCUMENTS

2011/0222523 A1* 9/2011 Fu ........................ H04W 36/22
370/338
2011/0319072 A1* 12/2011 Ekici ..................... H04W 48/18
455/426.1
(Continued)

FOREIGN PATENT DOCUMENTS

WO    2011087288 A2    7/2011
WO    2013023191 A1    2/2013

*Primary Examiner* — Kashif Siddiqui
(74) *Attorney, Agent, or Firm* — Dentons US LLP

(57) ABSTRACT

One embodiment of the present specification provides a transmission and reception method of a machine type communication (MTC) device. The transmission and reception method of an MTC device can comprise the steps of: switching from connectivity with the first cell to connectivity with a second cell if data to be transmitted and received is generated in a state of connectivity with a first cell; transmitting and receiving the data in a state of connectivity with the second cell; and switching from connectivity with the second cell to connectivity with the first cell when the transmission and reception of the data are completed.

10 Claims, 20 Drawing Sheets

(51) Int. Cl.
*H04W 36/24* (2009.01)
*H04W 4/00* (2009.01)

(52) U.S. Cl.
CPC ............ *H04L 5/0098* (2013.01); *H04W 4/005* (2013.01); *H04W 36/24* (2013.01); *H04L 5/0023* (2013.01)

(58) Field of Classification Search
CPC .............. H04W 36/00; H04W 36/0005; H04W 36/0088
See application file for complete search history.

(56) References Cited

U.S. PATENT DOCUMENTS

| | | | |
|---|---|---|---|
| 2011/0319080 A1 | 12/2011 | Bienas et al. | |
| 2012/0202508 A1 | 8/2012 | Toth et al. | |
| 2013/0229931 A1* | 9/2013 | Kim | H04W 24/10 370/252 |
| 2014/0140279 A1* | 5/2014 | Barrett | H04L 41/0806 370/328 |
| 2014/0171054 A1* | 6/2014 | Cai | H04W 76/04 455/418 |
| 2014/0241272 A1* | 8/2014 | Griot | H04W 74/0833 370/329 |
| 2014/0256324 A1* | 9/2014 | Mohanty | H04W 4/005 455/436 |
| 2015/0050954 A1* | 2/2015 | Kameno | H04W 48/18 455/509 |
| 2015/0181491 A1* | 6/2015 | Van Phan | H04W 28/08 370/331 |
| 2015/0181493 A1* | 6/2015 | Park | H04W 36/24 455/436 |
| 2016/0050605 A1* | 2/2016 | Kim | H04W 28/08 370/331 |
| 2016/0073442 A1* | 3/2016 | Koskinen | H04W 76/025 370/329 |

* cited by examiner (a)

(b)

ated through the PUCCH, the PUSCH, the MAC message, or the upper layer signal. The cell-in announcement may be transmitted through a PRACH or a scheduling request (SR).

TRANSMISSION AND RECEPTION METHOD OF MTC DEVICE

BACKGROUND OF THE INVENTION

Field of the Invention

The present invention relates to mobile communication.

Discussion of the Related Art

3GPP (3rd Generation Partnership Project) LTE (Long Term Evolution) that is an advancement of UMTS (Universal Mobile Telecommunication System) is being introduced with 3GPP release 8. The 3GPP LTE uses orthogonal frequency division multiple access (OFDMA) in a downlink and uses single carrier-frequency division multiple access (SC-FDMA) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in a next-generation mobile communication system, it is anticipated that a small cell having small cell coverage will be added into coverage of a macro cell.

Furthermore, it is anticipated that user equipment (UE) or a terminal can be dually connected to both the small cell and the macro cell through a carrier aggregation technique in the next-generation mobile communication system.

Meanwhile, in recent years, research into communication between devices or the device and a server without human interaction, that is, without human intervention, that is, machine type communication (MTC) has been actively conducted. The MTC represents a concept in which not a terminal used by human but a machine performs communication by using the existing wireless communication network.

However, the MTC device will not have a low capability, for example, a carrier aggregation (CA) function in order to increase a supply rate with low cost. In this case, there is a problem that the MTC device cannot be dually connected to both the small cell and the macro cell.

SUMMARY OF THE INVENTION

Accordingly, the disclosure of the specification has been made in an effort to solve the problem.

In order to achieve the aforementioned object, the present invention provides a transmission and reception method of an MTC device. The method may comprise: switching from connectivity with a first cell to connectivity with a second cell if data to be transmitted and received is generated in a state of connectivity with the first cell; transmitting and receiving the data in a state of connectivity with the second cell; and switching from the connectivity with the second cell to the connectivity with the first cell.

The method may further comprise: transmitting a cell-out announcement to the first cell before switching from the connectivity with the first cell to the connectivity with the second cell for transmission of uplink data. The cell-out communication may be transmitted through a physical uplink control channel (PUCCH), a physical uplink shared channel (PUSCH), a medium access control (MAC) message, or an upper layer signal.

The method may further comprise: receiving a cell-out recommendation from the first cell before switching from the connectivity with the first cell to the connectivity with the second cell for reception of downlink data. The cell-out recommendation may be received through a physical downlink control channel (PDCCH), a physical downlink shared channel (PDSCH), the MAC message, or the upper layer signal.

The method may further comprise: after the switching from the connectivity with the first cell to the connectivity with the second cell, transmitting a cell-in announcement to the second cell. The cell-in announcement may be transmitted through the PUCCH, the PUSCH, the MAC message, or the upper layer signal. The cell-in announcement may be transmitted through a PRACH or a scheduling request (SR).

The method may further comprise: after the switching from the connectivity with the second cell to the connectivity with the first cell, transmitting the cell-in announcement to the first cell.

In order to achieve the aforementioned object, the present invention provides a machine type communication (MTC) device. The MTC device may comprise: an RF unit; and a processor controlling, when data to be transmitted and received is generated in a state of connectivity with a first cell, the RF unit to switch from connectivity with the first cell to connectivity with a second cell and thereafter, transmitting and receiving data in a state of connectivity with the second cell, and controlling the RF unit again to switch from the connectivity with the second cell to the connectivity with the first cell when the transmission and reception of the data are completed.

According to the disclosure of the specification, the problem in the related art is solved.

DETAILED DESCRIPTION OF THE EMBODIMENTS

Figure 1:
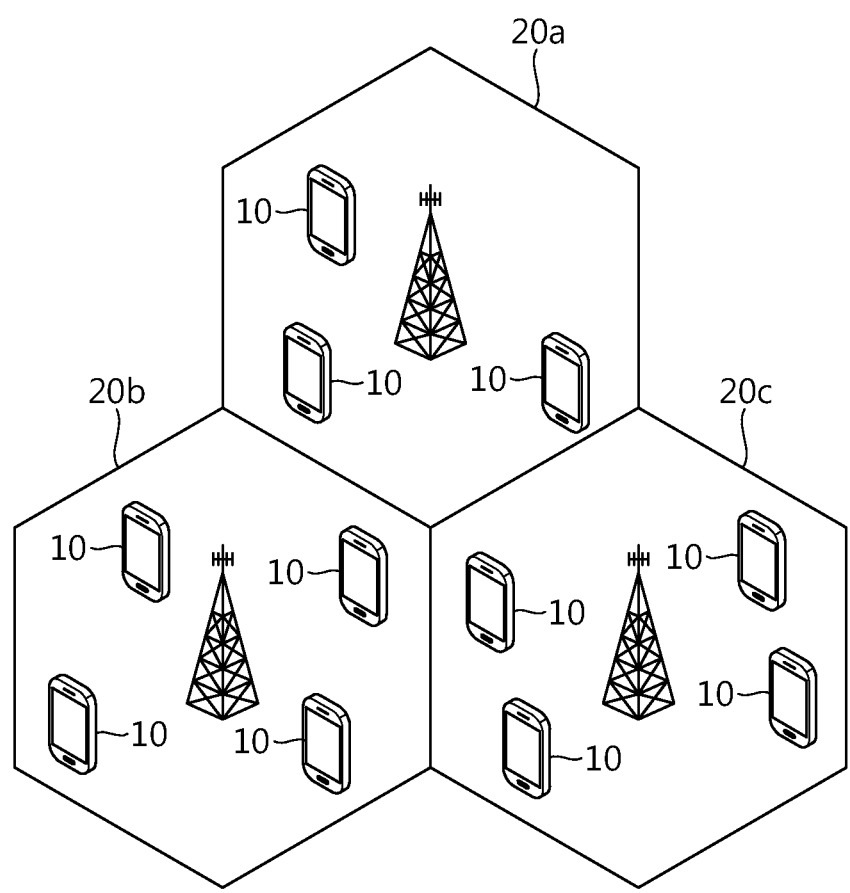
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Shows a Wireless Communication System.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
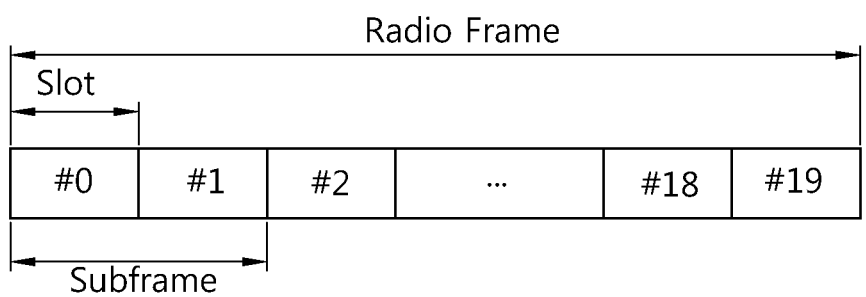
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
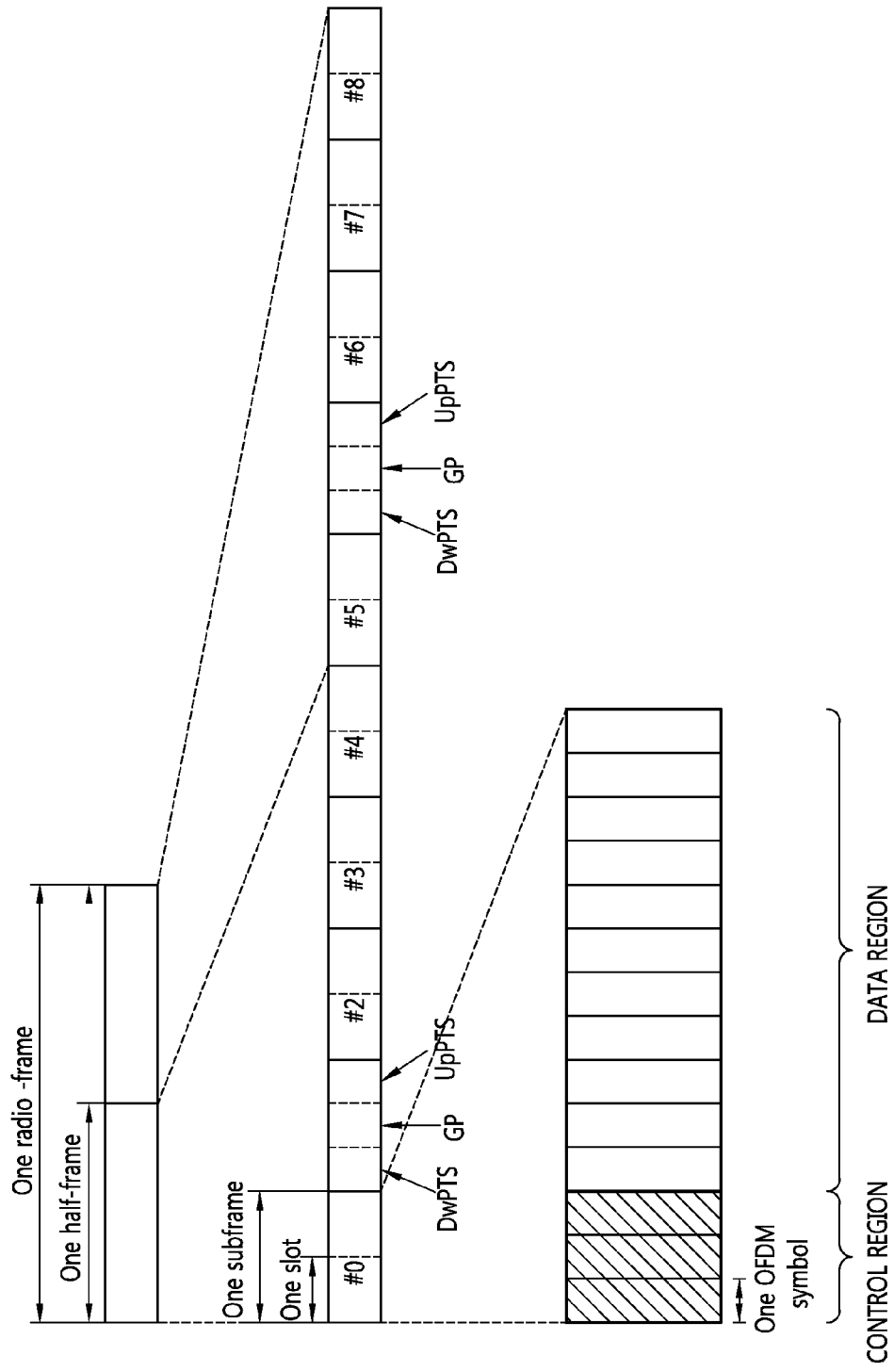
FIG. 3 illustrates the architecture of a downlink radio frame according to time division duplex (TDD) in 3GPP LTE.

FIG. 3 Shows an Example of a Resource Grid for One Uplink or Downlink Slot in 3GPP LTE.

This may refer to a chapter 6 of 3GPP TS 36.211 V10.4.0 (2011-16) "Evolved Universal Terrestrial Radio Access (E-UTRA); Physical Channels and Modulation (Release 8)". 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configu- raiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, '11' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
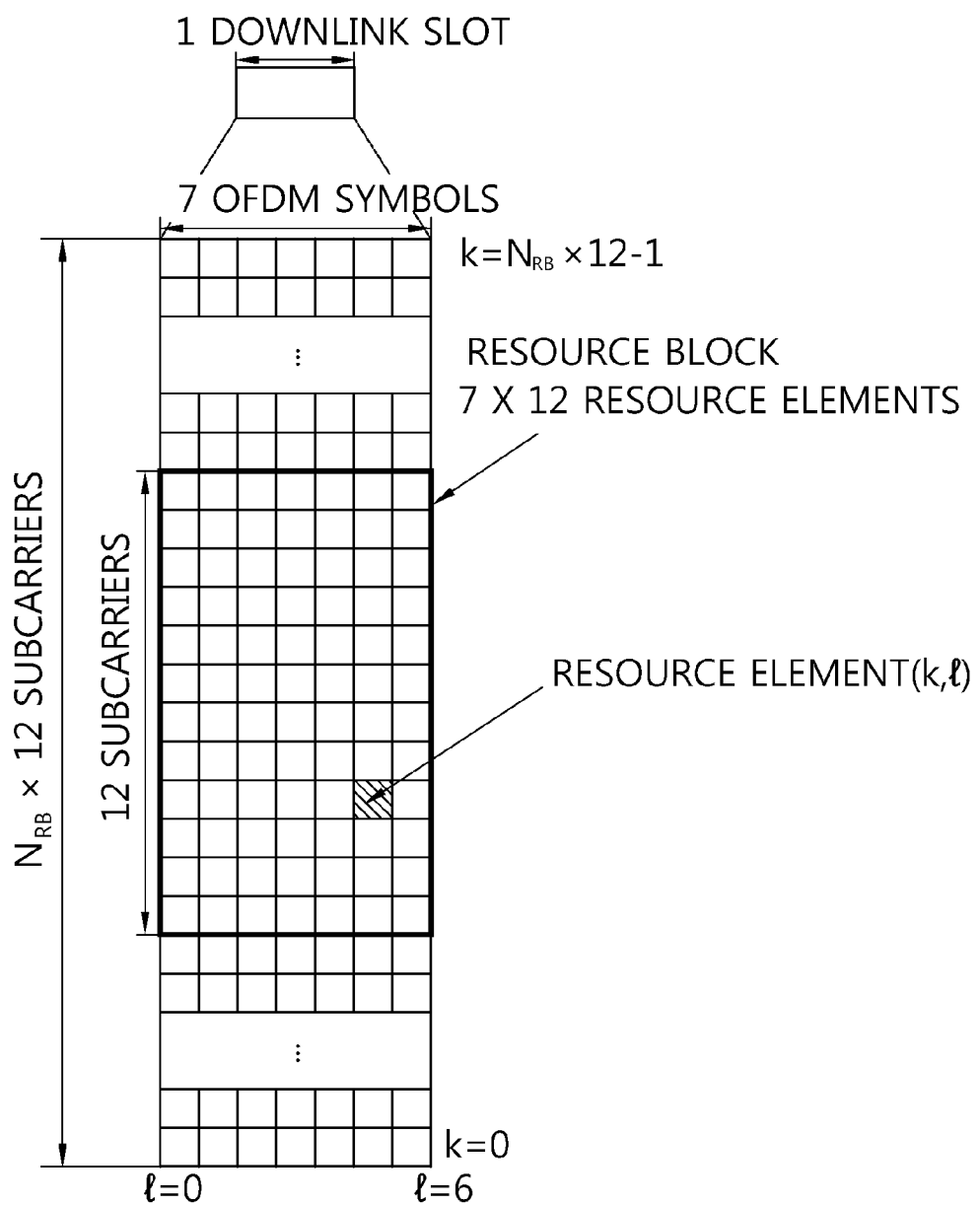
FIG. 4 illustrates an example resource grid for one uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
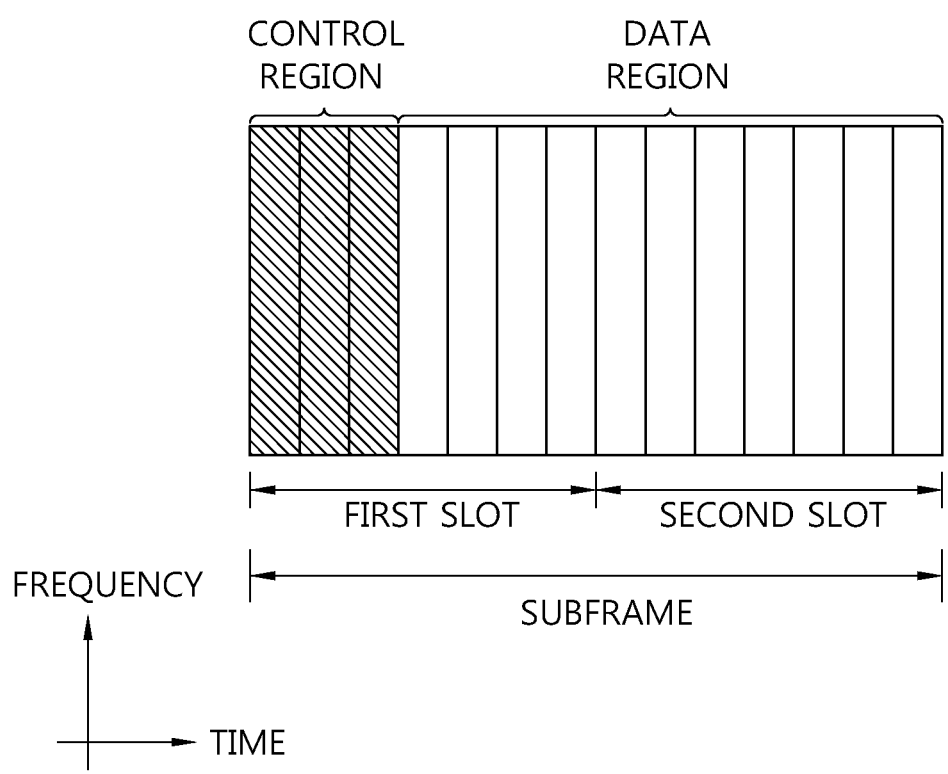
FIG. 5 illustrates the architecture of a downlink subframe.

FIG. 5 Illustrates the Architecture of a Downlink Sub-Frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH transports an ACK (positive-acknowledgement)/NACK (negative-acknowledgement) signal for the hybrid automatic repeat (HARQ) signal. The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
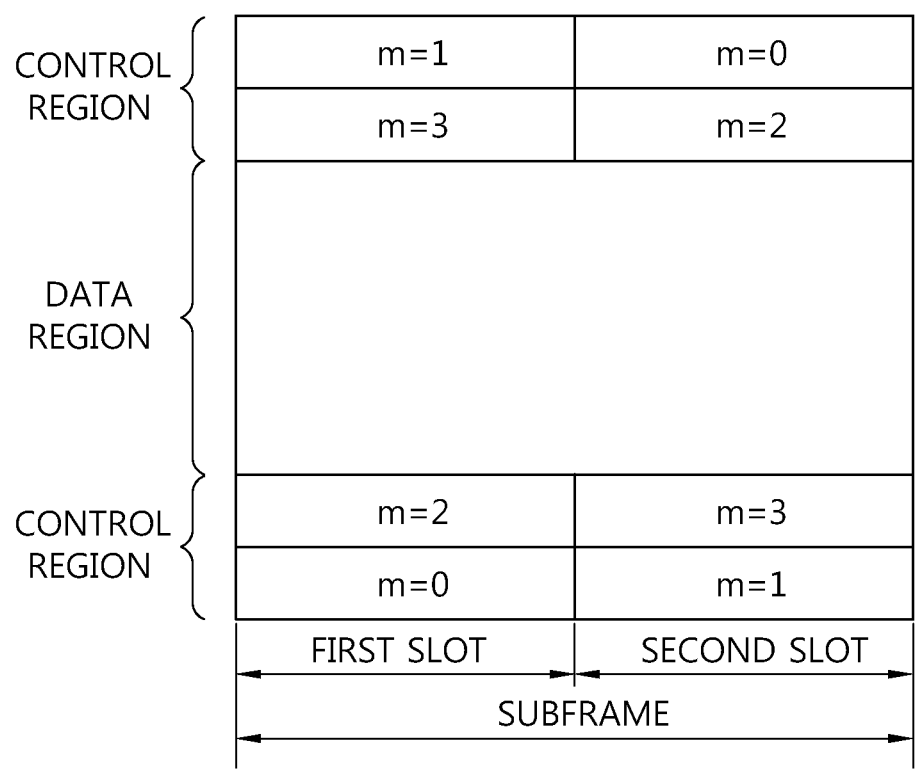
FIG. 6 illustrates the architecture of an uplink subframe in 3GPP LTE.
Figure 6:
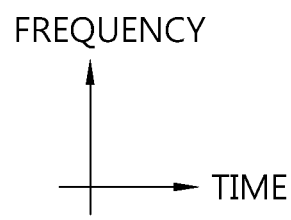

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
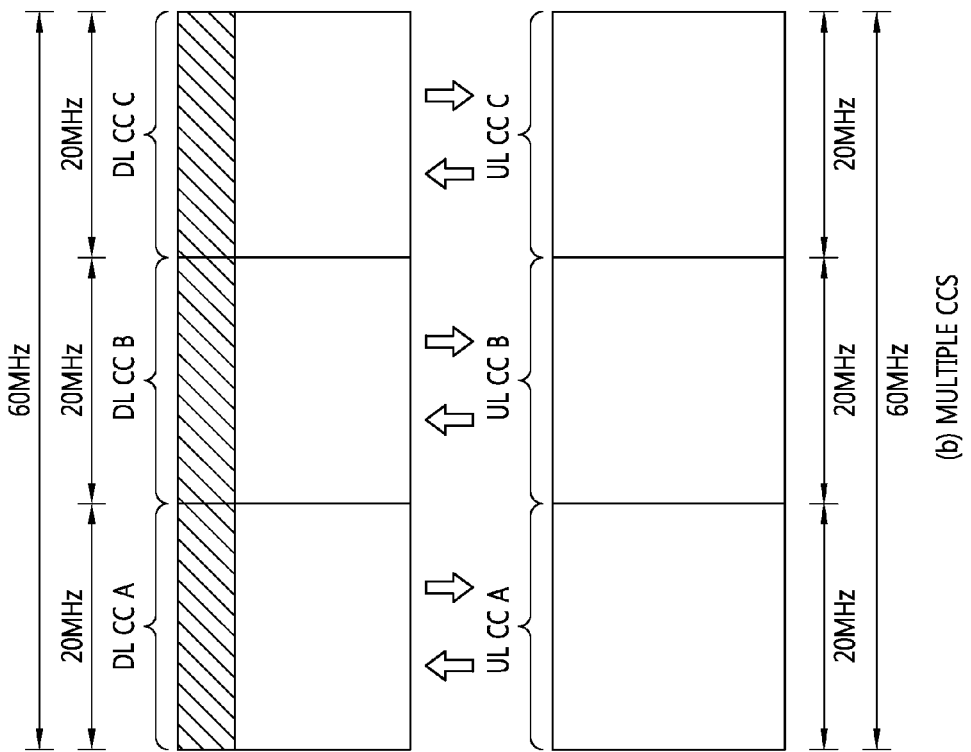
FIG. 7 illustrates an example of comparison between a single carrier system and a carrier aggregation system.
Figure 7:
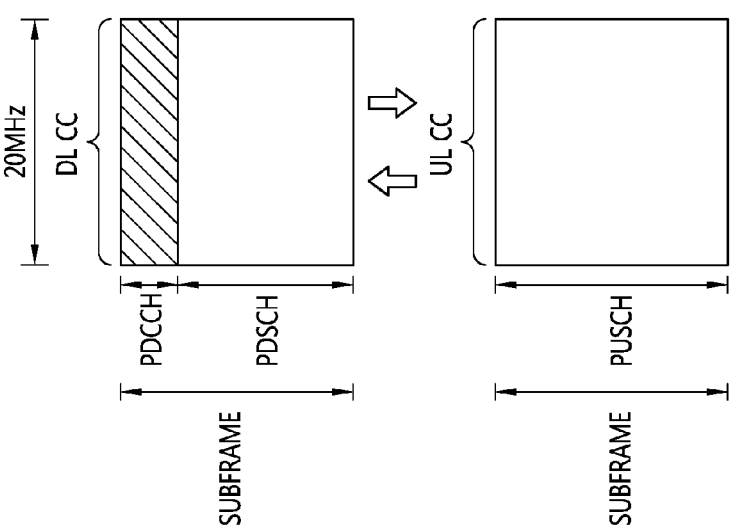

FIG. 7 Illustrates an Example of Comparison Between a Single Carrier System and a Carrier Aggregation System.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
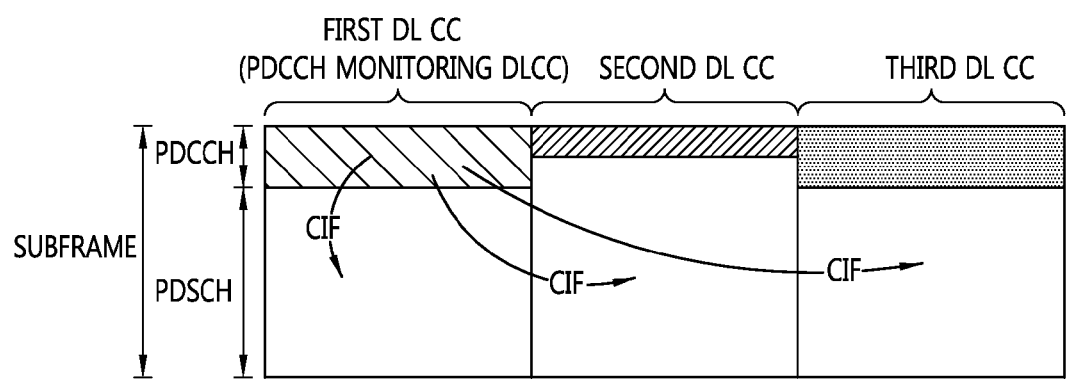
FIG. 8 exemplifies cross-carrier scheduling in a carrier aggregation system.

FIG. 8 Exemplifies Cross-Carrier Scheduling in the Carrier Aggregation System.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

FIG. 8 Exemplifies Cross-Carrier Scheduling in the Carrier Aggregation System.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, hereinafter, the MTC will be described.

Figure 9A:
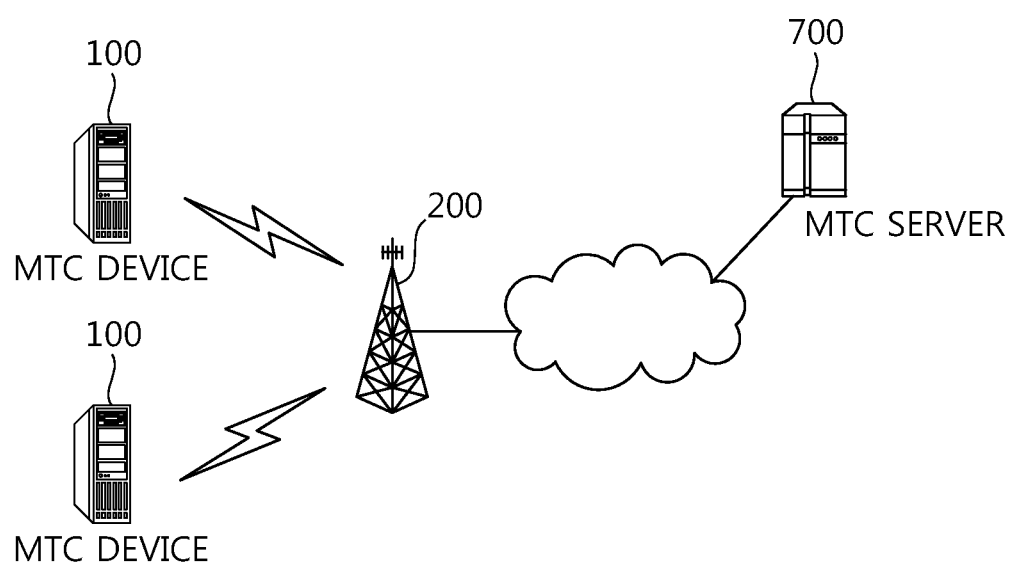
FIG. 9A illustrates one example of machine type communication (MTC).

FIG. 9A Illustrates One Example of Machine Type Communication (MTC).

The machine type communication (MTC) represents an information exchange through a base station 200 among MTC devices 100, which does not accompany human interaction or an information exchange between the MTC device 100 and an MTC server 700 through the base station.

The MTC server 700 is an entity that communicates with the MTC device 100. The MTC server 700 executes an MTC application and provides an MTC specific service to the MTC device.

The MTC device 100 as a wireless device that provides the M2M communication may be fixed or movable.

A service provided through the MTC has a differentiation from a service in communication interfered by human in the related and includes various categories of services including tracking, metering, payment, a medical field service, remote control, and the like. In more detail, the service provided through the MTC may include reading of a meter, measurement of a water level, utilization of a monitoring camera, stock management of a vending machine, and the like.

In the case of peculiarities of the MTC device, since a transmission data amount is small and uplink/downlink transmission/reception is often performed, it is efficient to lower a price of the MTC device and reduce battery consumption according to the low data transmission rate. The MTC device has a characteristic in that mobility is low, and as a result, the MTC device has a characteristic in which a channel environment is not almost changed.

Figure 9B:
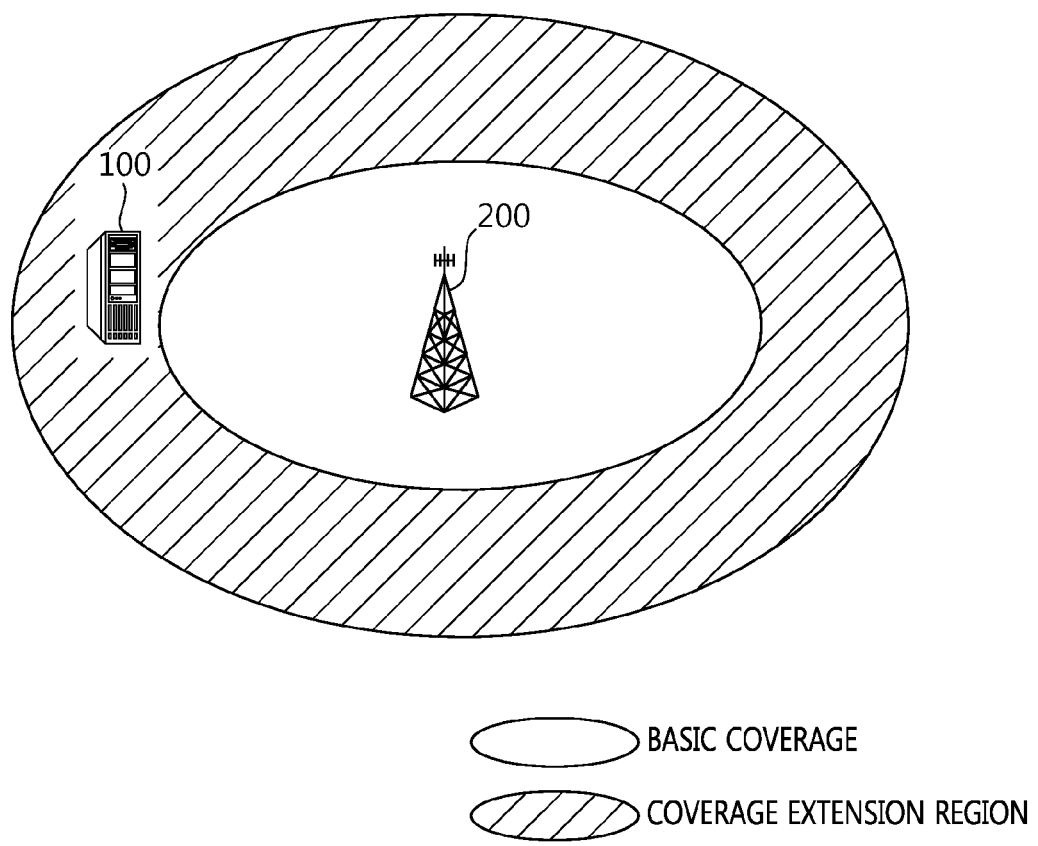
FIG. 9B is an example of cell coverage extension for an MTC device.

FIG. 9B is an Example of Cell Coverage Extension for the MTC Device.

In recent years, extending cell coverage of the base station has been considered for the MTC device 100 and various techniques for extending the cell coverage have been discussed.

However, in the case where the coverage of the cell is extended, when the base station a PDSCH including a system information block (SIB) and a PDCCH including scheduling information for the PDSCH as if transmitting the PDSCH and the PDCCH to general UE to the MTC device positioned in the coverage extension area, the MTC device is difficult to receive the PDSCH and the PDCCH.

In order to solve the aforementioned problem, when the base station transmits the PDSCH and the PDCCH to the MTC device positioned in the coverage extension area, the base station repeatedly transmits the PDSCH and the PDCCH on various subframes (for example, bundling subframe).

Figure 9C:
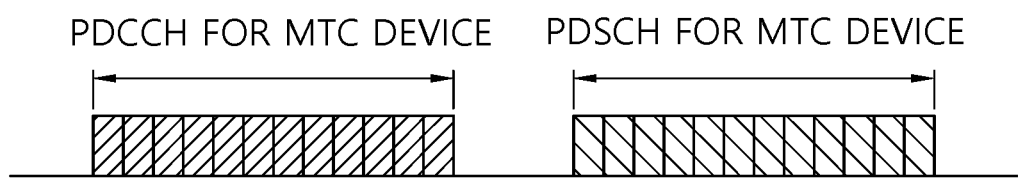
FIG. 9C is an exemplary diagram illustrating an example of bundling transmission of a PDCCH and a PDSCH.

FIG. 9C is an Exemplary Diagram Illustrating an Example of Bundling Transmission of a PDCCH and a PDSCH.

As illustrated in FIG. 9C, the PDCCH and the PDSCH may be repeatedly transmitted (that is, bundling transmission) on various subframes for the MTC device 100 positioned in the coverage extension area. For example, the base station may transmit the PDCCH by using a bundle of a total of N subframes.

However, the bundling transmission may be a large burden in terms of a buffer size of the base station or a delay. Moreover, since the uplink requires more bundling than the downlink, the burden may be further increased.

Figure 10:
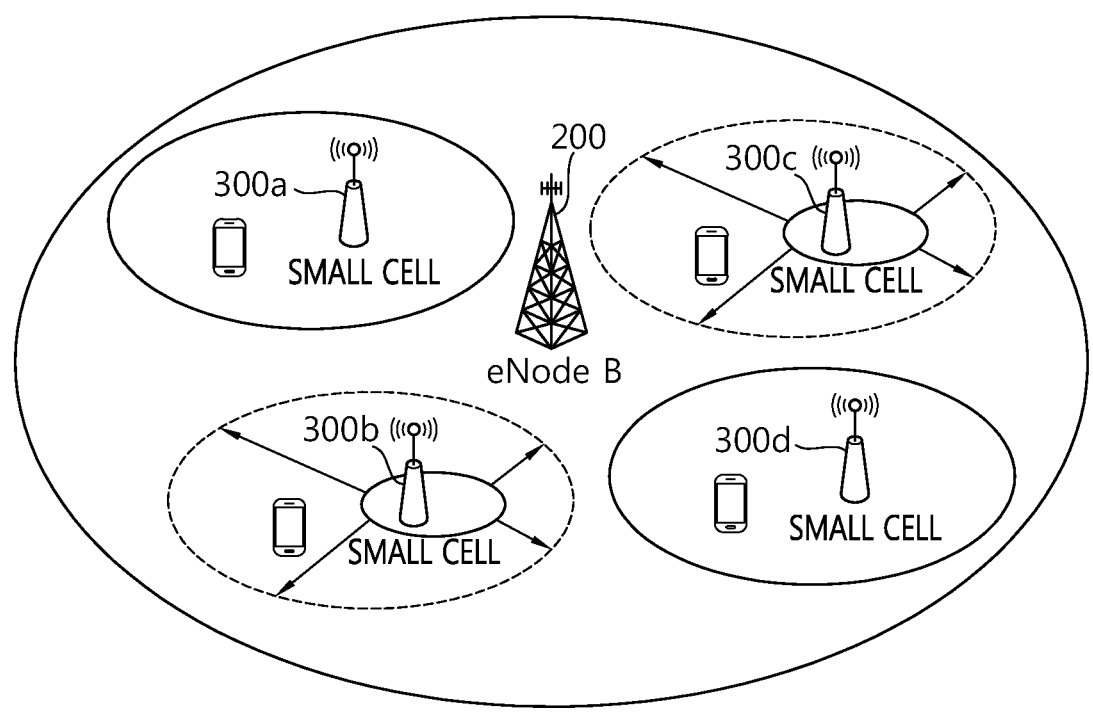
FIG. 10 is a diagram illustrating an environment of heterogeneous networks in which a macro cell and a small cell are mixed which may be a next-generation wireless communication system.

FIG. 10 is a Diagram Illustrating an Environment of Heterogeneous Networks in which a Macro Cell and a Small Cell are Mixed which May be a Next-Generation Wireless Communication System.

In a next-generation communication standard after 3GPP LTE/LTE-A, a heterogeneous network has been discussed, in which one or more small cells 300a, 300b, 300c, and 300d having lower-power transmission power, for example, a pico cell, a femto cell, or a micro cell overlap with each other.

Referring to FIG. 10, a macro cell 200 may overlap with one or more small cells 300. A service of the macro cell 200 is provided by a macro base station (macro eNodeB, MeNB). In the present specification, the macro cell and the macro base station may be mixedly used. UE that accesses the macro cell 200 may be designated as macro UE. The macro UE receives a downlink signal from the macro base station and transmits an uplink signal to the macro base station.

The small cells 300a, 300b, 300c, and 300d are designated even as the femto cell, the pico cell, or the micro cell. A service of the small cell is provided by a pico base station (Pico eNodeB), a home base station (Home eNodeB, HeNB), a relay node (RN), and the like. For easy description, the pico base station (Pico eNodeB), the home base station (Home eNodeB, HeNB), and the relay node (RN) are commonly designated as the home base station (HeNB). In the present specification, the micro cell and the home base station may be mixedly used. The small cell may be divided into an open access (OA) cell and a closed subscriber group (CSG) cell. The OA cell means a cell in which the UE may receive the service anytime as necessary without a separate access restriction. On the contrary, the CSG cell means a cell in which only specific UE which is permitted may receive the service.

In such a heterogeneous network, the macro cell is established as a primary cell (Pcell) and the small cell is established as a secondary cell (Scell) to fill a coverage gap of the macro cell. Further, the small cell is established as the primary cell (Pcell) and the macro cell is established as the secondary cell (Scell) to boost an overall capability.

On the other hand, the illustrated small cells 300b and 300c may extend or scale down coverage thereof in order to reduce an interference influence in other adjacent small cells 300a and 300d or the macro cell 200 depending on the situation. As such, the extension and the scaling-down are referred to as cell breathing. Alternatively, the small cells 300b and 300c may be turned on or off depending on the situation.

On the other hand, the small cell may currently use a frequency band assigned as LTE/LTE-A or a higher frequency band (for example, a band of 3.5 GHz or higher).

Meanwhile, the UE may be dually connected to the macro cell and the small cell. Scenarios in which the dual connectivity is available are illustrated in FIGS. 11A to 11D.

FIGS. 11A to 11D Illustrate Scenarios of Dual Connectivity Available with Respect to the Macro Cell and the Small Cell.

Figure 11A:
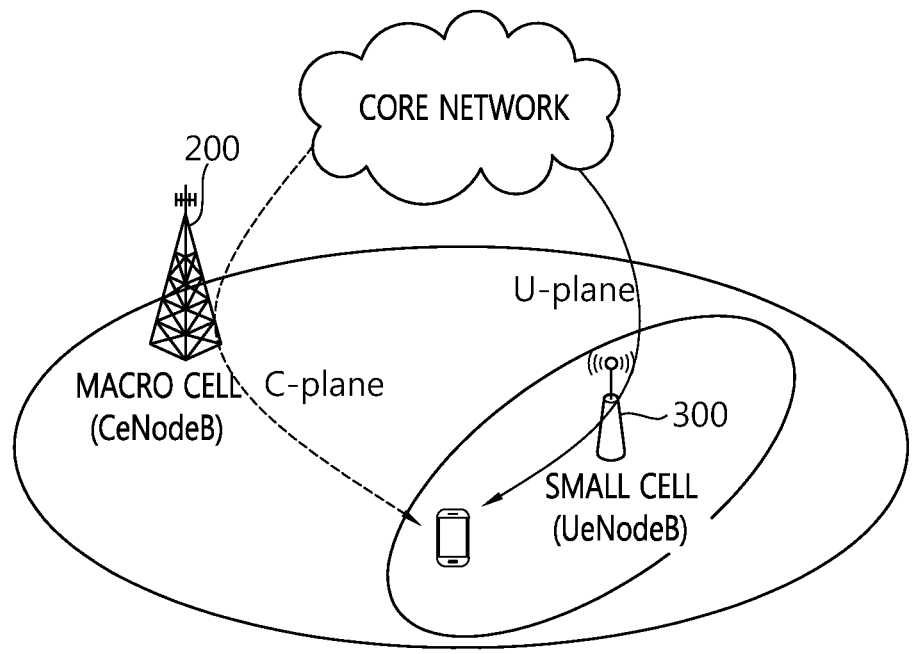
FIGS. 11A to 11D illustrate scenarios of dual connectivity available with respect to the macro cell and the small cell.

As illustrated in FIG. 11A, the UE may establish the macro cell as a control plane (hereinafter, referred to as 'C-plane') and the small cell as a user plane (hereinafter, referred to as U-plane).

Figure 11B:
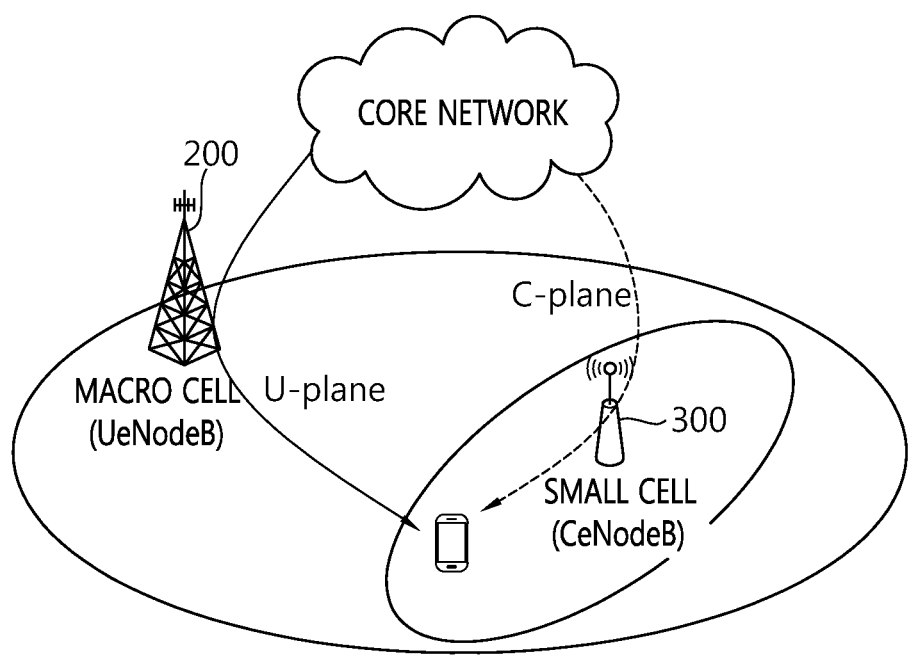

Alternatively, as illustrated in FIG. 11B, the UE may establish the small cell as C-plane and the macro cell as U-plane. In the present specification, for easy description, the cell of the C-plane will be designated as 'C-Cell' and the cell of the U-plane will be designated as 'U-Cell'.

Herein, the mentioned C-plane means supporting a procedure for RRC connection establishment and reestablishment, an RRC idle mode, mobility including handover, cell selection, reselection, an HARQ process, establishment and reestablishment of carrier aggregation (CA), a procedure required for RRC establishment, a random access procedure, and the like. In addition, the mentioned U-Plane means supporting data processing of an application, CSI reporting, an HARQ process for application data, a multicasting/broadcasting service, and the like.

From the viewpoint of the UE, the C-plane and the U-plane are established as described below. The C-Cell may be established as the primary cell and the U-Cell may be established as the secondary cell. Alternatively, on the contrary, the U-Cell may be established as the primary cell and the C-Cell may be established as the secondary cell. Alternatively, the C-Cell may be separately particularly processed and the U-Cell may be established as the primary cell. Alternatively, both the C-Plane and the U-Cell may be established as the primary cell. However, in the present specification, for easy description, the establishment will be described by assuming that the C-Cell is established as the primary cell and the U-Cell is established as the secondary cell.

Figure 11C:
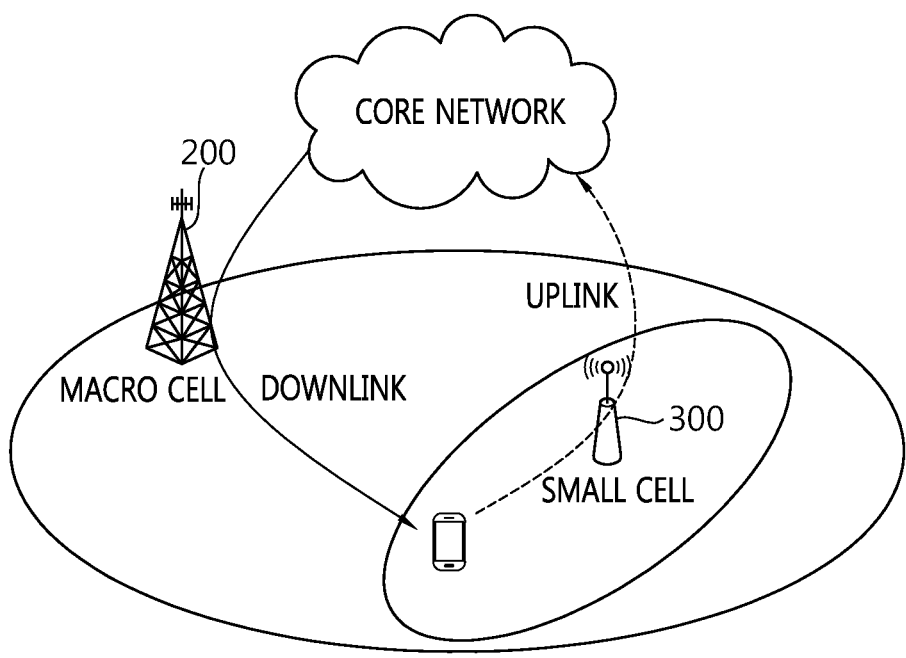

Meanwhile, as illustrated in FIG. 11C, the UE (alternatively, MTC device) 100 may establish the macro cell for the downlink and establish the small cell for the uplink. Alternatively, on the contrary, the UE (alternatively, MTC device) 100 may establish the macro cell for the uplink and the small cell for the downlink.

Figure 11D:
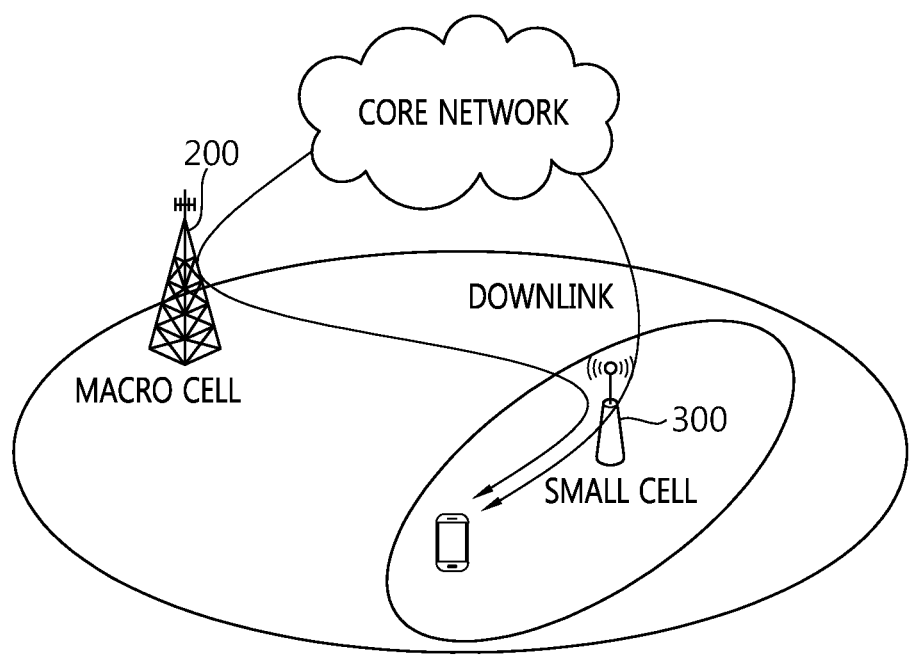

Alternatively, as illustrated in FIG. 11D, the UE (alternatively, MTC device) 100 may establish connectivity with the macro cell via the small cell in addition to connectivity with the small cell.

However, it is anticipated that the MTC device 100 will have a low capability (for example, the carrier aggregation (CA) may not be supported) in order to increase the supply rate with low cost. When the MTC device 100 is positioned in an environment in which the small cell 300 and the macro cell 200 are mixedly used, the MTC device 100 may preferably use the small cell 300 positioned therearound rather than transmitting and receiving data from the macro cell positioned far therefrom for a purpose such as coverage extension or power saving. However, when the small cell 300 performs only a macro assistance role, there is a problem that the MTC device 100 which may not support the CA may not use the small cell 300.

<Scheme According to One Disclosure of the Present Specification>

Accordingly, hereinafter, a method in which the MTC device 100 which may not support the CA communicates with the small cell 300 that operates only as a macro cell assisted cell will be proposed. In the present invention, for easy description, the MTC device 100 will be described, but the method may be all applied to the general UE.

Figure 12:
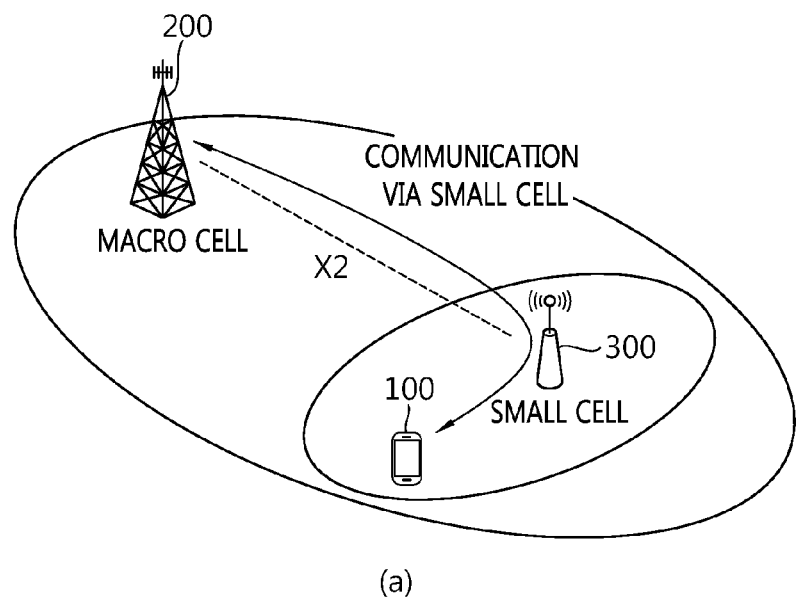
FIG. 12 is an exemplary diagram illustrating a scheme for the MTC device to communicate with a small cell that operates as a macro-assisted cell according to one disclosure of the present specification.
Figure 12:
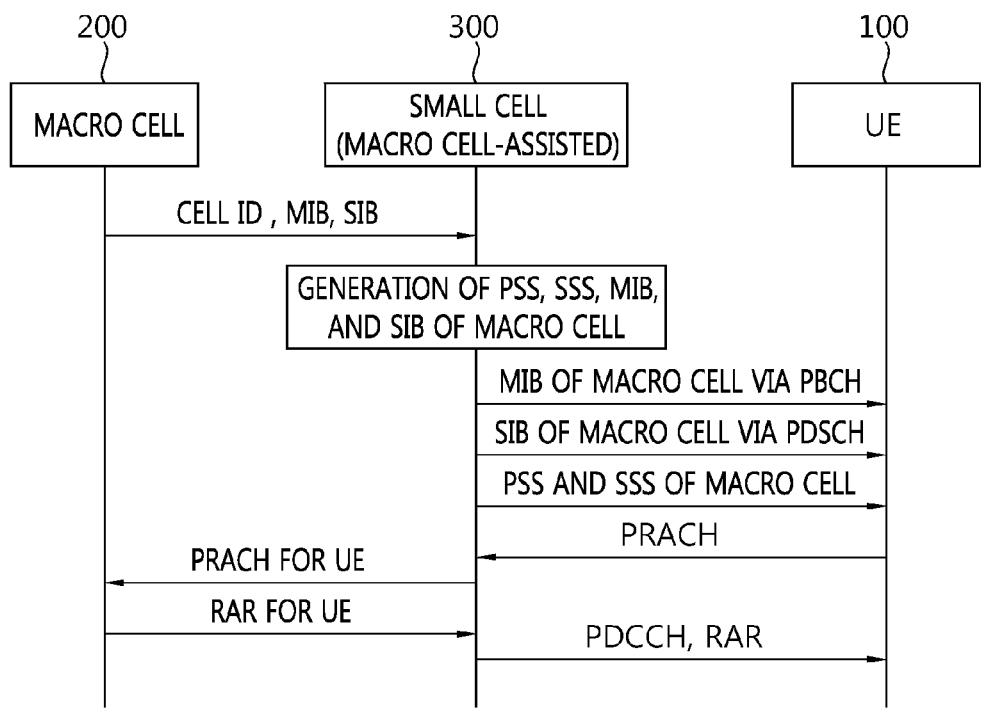

FIG. 12 is an Exemplary Diagram Illustrating a Scheme for the MTC Device to Communicate with a Small Cell that Operates as a Macro-Assisted Cell According to One Disclosure of the Present Specification.

As illustrated in FIG. 12A, the small cell 300 is positioned in the coverage of the macro cell and the MTC device 100 is positioned in a coverage overlap area of the small cell 300 and the macro cell 200. In this case, it is assumed that the macro cell 200 operates at a center frequency F1 and the small cell 300 operates at a center frequency F2. Since the MTC device 100 may not support the carrier aggregation (CA) due to the low capability, the MTC device 100 may not simultaneously connected to the small cell 300 and the macro cell 200. Moreover, the small cell 300 is connected with the macro cell 200 through an interface, for example, an X2 interface and operates only as the macro-assisted cell.

Therefore, the MTC device 100 may communicate with the macro cell via the small cell as illustrated in FIG. 12A. A detailed procedure will be described as below.

As illustrated in FIG. 12B, the macro cell 200 transfers a cell ID and system information (for example, MIB and SIB) to the small cell 300. Then, the small cell 300 generates a primary synch signal (PSS) and a secondary synch signal (SSS). Further, the small cell 300 generates a PBCH by using the MIB of the macro cell 200 and generates a PDSCH by using the SIB of the macro cell 200. Subsequently, the small cell 300 transmits the PSS, SSS, PBCH, and PDSCH. Of course, the small cell 300 may generate and transmit the PSS and the SSS by using the cell ID thereof. Further, the small cell 300 may generate and transmit the PBCH by using the MIB thereof.

In this case, the MTC device 100 may obtain from the MIB or SIB of the macro cell information on the center frequency F2 of the small cell 300 which may be used for transmitting and receive data. As a result, the MTC device 100 may attempt to detect the cell by using the cell ID of the macro cell on the center frequency F2. In this case, the detection may be performed through the ID of the macro cell. When the cell is detected as described above, the MTC device 100 may receive the MIB and SIB of the macro cell from the small cell. Thereafter, the MTC device 100 may obtain PRACH configuration information of the SIB of the small cell and transmit the PRACH to the small cell according to the PRACH configuration information.

As described above, the small cell 300 receives the information such as the cell ID, the MIB, the SIB, and the like of the macro cell from the macro cell 200 to substitutingly transmit the PSS, SSS, MIB, SIB, and the like which the macro cell needs to transmit. In this case, the small cell 300 may be allocated with information such as a time interval and a time offset in which the small cell 300 needs to transmit the PSS, SSS, MIB, SIB, and the like of the macro cell.

The communication method described as above is described again, which may be effective in the following situation. In an environment in which the small cell 300 and the macro cell are mixedly used, when the MTC device 100 which may not support the carrier aggregation (CA) due to the low capability intends to use the small cell 300 that operates only as the macro-assisted cell, the MTC device 100 may first receive downlink signals from the macro cell. In this case, the MTC device 100 may receive the MIB and the SIB from the macro cell and receive information on the center frequency F2 at which the small cell 300 operates. In this case, the small cell 300 that operates at the center frequency F2 may transmit the PSS/SSS, PBCH, SIB, and the like on the center frequency F2 by using the cell ID of the macro cell in order to support the MTC device 100. In this case, the MTC device 100 detects the small cell 300 by attempting detecting the cell by using the cell ID of the macro cell, and as a result, the MTC device 100 may recognize the small cell 300 as the macro cell. Thereafter, when the MTC device 100 transmits and receives data to and from the small cell on the center frequency F2, the small cell relays the data to the macro cell.

On the other hand, although not illustrated, the scheme for the communication between the small cell that operates as the macro-assisted cell and the MTC device may be modified as below.

As a first modified example, the MTC device 100 may detect a first cell (for example, the macro cell) of which the center frequency is positioned at F1 and receive the MIB and the SIB from the detected first cell. In this case, the MTC device 100 may configure from the MIB or SIB of the first cell information related to a cell ID of a second cell to be used for transmitting and receiving data and the center frequency F2 used by the second cell. Simultaneously, the MTC device 100 may receive information on the PRACH configuration from the first cell through the SIB. Thereafter, the MTC device 100 may transmit the PRACH to the second cell by using the received PRACH configuration. The second cell may extract information on an RACH from the received PRACH and transfers the extracted information on the RACH to the first cell. Then, the MTC device 100 may receive a random access response (PAR) from the first cell or the second cell. Thereafter, the MTC device 100 is connected with both the first cell and the second cell to use the first cell as the C-Cell and use the second cell as the U-Cell.

As a second modified example, the MTC device 100 detects the first cell of which the center frequency is positioned at F1, receives the MIB and the SIB from the detected first cell, and transmits the PRACH to the first cell to perform an initial access. Thereafter, the MTC device 100 configures the second cell as the secondary cell from the first cell to use the first cell as the cell of the C-Plane and the second cell as the U-Cell.

However, as a caution point, although it has been described above that the MTC device may not support the carrier aggregation (CA) due to the low capability, it is described that the MTC device 100 uses the first cell as the cell of the C-Plane and uses the second cell as the U-Cell, it may be appreciated that both descriptions are contradictory to each other. However, one disclosure of the present specification intends to propose a TDM scheme given below in order for the MTC device 100 which may not support the carrier aggregation (CA) due to the low capability to use the first cell as the cell of the C-Plane and use the second cell as the U-Cell.

Hereinafter, for easy description, it is described that the MTC device 100 uses one C-Cell and one U-Cell, but the MTC device 100 may be connected to a plurality of C-Cells and a plurality of U-Cells. Further, contents to be described below may be effective to a device having a small traffic amount, such as the MTC device 100.

<TDM Operation According to Another Disclosure of the Present Specification>

First, when there is no datum which the MTC device 100 will transmit and receive, the MTC device 100 may operate in the C-Cell. In this case, when the MTC device operates in the C-Cell may mean that the MTC device performs all or some of operations described below.

The MTC device 100 receives the MIB and the SIB from the C-Cell.

The MTC device 100 keeps synchronization with the C-Cell.

The MTC device 100 monitors a common search space (CSS) of the C-Cell to receive a cell-specific PDSCH.

The MTC device 100 receives data of the control plane from the C-Cell and performs an HARQ operation for the received data.

The MTC device 100 receives a paging signal from the C-Cell.

Meanwhile, when data to be transmitted and received is generated, the MTC device 100 moves from the C-Cell to the U-Cell. That is, while the MTC device 100 operates in the C-Cell, when the data to be transmitted and received is generated, the MTC device 100 switches an operating frequency thereof to a frequency at which the U-Cell operates.

Hereinafter, an example in which the MTC device moves between the C-Cell and the U-Cell according to uplink data transmission and downlink data reception will be described with reference to FIGS. 13 and 14.

Figure 13:
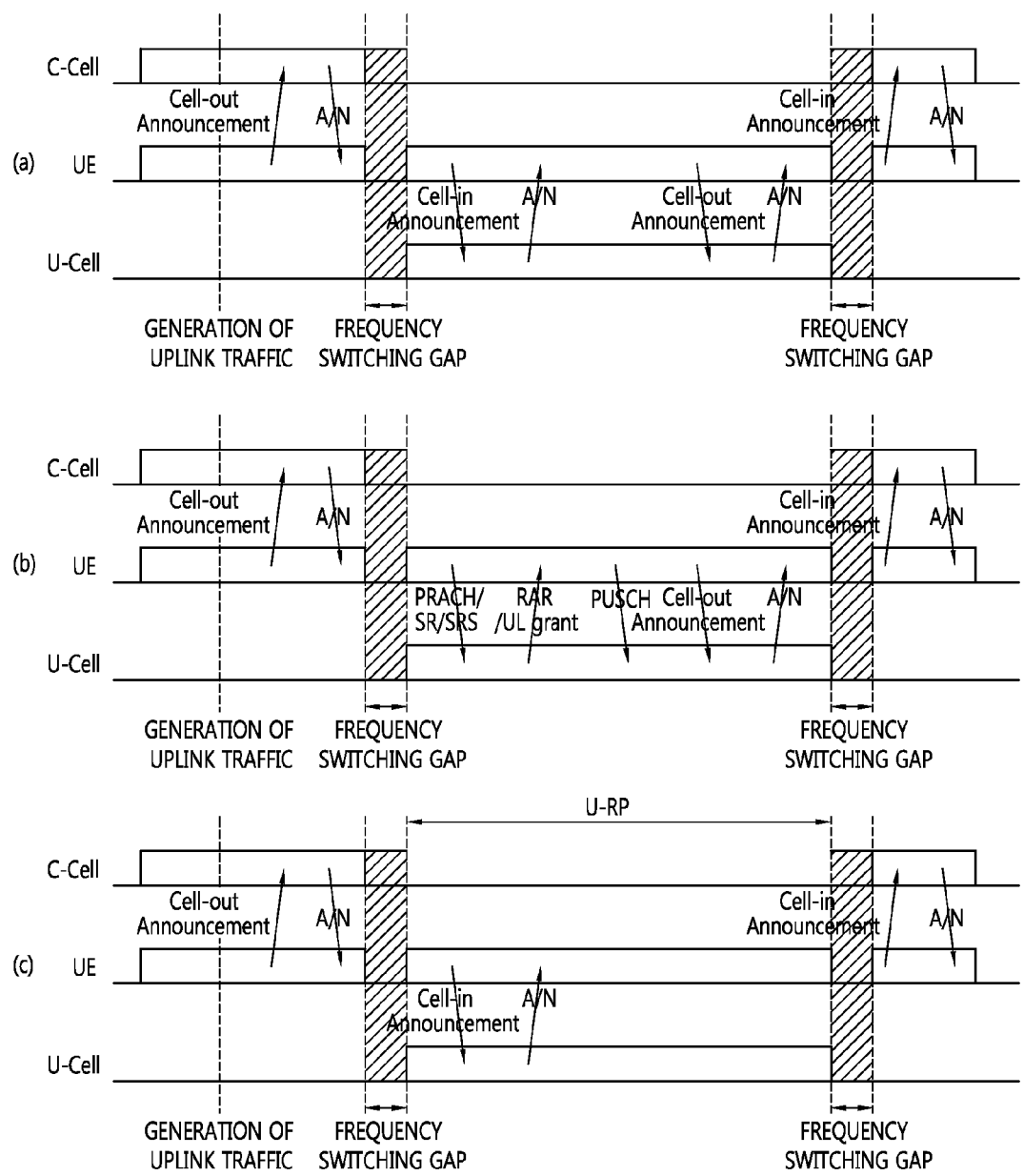
FIG. 13 illustrates a TDM scheme for uplink traffic transmission.

FIG. 13 Illustrates a TDM Scheme for Uplink Traffic Transmission.

As known with reference to FIGS. 13A, 13B, and 13C, when uplink traffic to be transmitted is generated, the MTC device 100 may announce to the C-Cell that the MTC device shifts the operating frequency thereof. The announcement may be performed when the MTC device 100 recognizes generation of uplink data which the MTC device 100 needs to transmit. In more detail, the MTC device 100 may transmit a cell-out announcement to the C-Cell before shifting the operating frequency of the MTC device 100.

The cell-out announcement may be transmitted through the PUCCH or PUSCH or transmitted through an MAC message or an upper layer signal.

The cell-out announcement as 1 bit may be used for the MTC device 100 to just announce that the MTC device 100 will change the operating cell thereof. Alternatively, the cell-out announcement may be constituted by a plurality of bits and represent various information. For example, the cell-out announcement of the plurality of bits may include a carrier indicator. The carrier indicator may indicate an index of a carrier where the MTC device 100 will move. Further, the cell-out announcement of the plurality of bits may include a U-Plane reception period (U-RP). The U-RP may represent a period when the MTC device 100 operates in the U-Cell by shifting the operating frequency. Herein, when a value of the carrier indicator indicates an index of a carrier where the MTC device 100 operates at present, the value may mean that the MTC device 100 intends to not shift the operating frequency. Similarly, when a value of the U-RP indicates 0, the value may mean that the MTC device 100 intends to not shift the operating frequency.

The MTC device 100 may receive an ACK for the cell-out announcement and thereafter, shift the operating cell thereof to the U-Cell. In this case, when the MTC device 100 has the plurality of U-Cells, the MTC device 100 may make a cell index for the U-Cell to which the MTC device 100 will move be included in the carrier indicator of the cell-out announcement.

Thereafter, the MTC device 100 may switch the operating frequency thereof to be suitable for the U-Cell during an illustrated frequency switching gap. In this case, the frequency switching gap may be shared by the MTC device 100 and the corresponding cell.

- A value of the frequency switching gap may be a predefined fixed value.
- The value of the frequency switching gap as a cell-specific value may be a set configured to the MTC device 100 through the SIB, the MAC message, or the upper layer signal.
- The value of the frequency switching gap may be set differently for each carrier when multiple carriers configured in the MTC device 100 are provided. The value of the frequency switching gap as a cell-specific value as described above may be a set configured to the MTC device 100 through the SIB, the MAC message, or the upper layer signal.
- The value of the frequency switching gap may be a value specific to the MTC device 100 or a value configured to the MTC device 100 through the PDCCH, the MAC message, or the upper layer signal.
- The value of the frequency switching gap may be a value which may be announced together when the MTC device 100 transmits the cell-out announcement to a Cell_C.
- A plurality of frequency switching gap values may be provided. For example, when the values of the frequency switching gaps are g1 and g2, if a value of a frequency switching gap field is '0', the value may mean that g1 is used and if the value of the frequency switching gap field is '1', the value may mean that g2 is used. Alternatively, the field of the frequency switching gap may be constituted by multiple bits and each bit may indicate two values.

On the other hand, as known with reference to FIGS. 13A and 13C, the MTC device 100 may transmit a cell-in announcement to the U-Cell after moving to the U-Cell. The cell-in announcement may be used for the MTC device 100 to announce that the MTC device 100 enters the corresponding cell to transmit and receive data. The cell-in announcement may be transmitted through a previously configured PUCCH/PUSCH resource.

Alternatively, as known with reference to FIG. 13B, the cell-in announcement may be substituted with transmission of the PRACH, the scheduling request (SR), or the SRS.

After transmitting the cell-in announcement, the MTC device 100 receives the ACK from the U-Cell or receives the PAR or an uplink grant, and as a result, it may be known that the U-Cell recognizes that the MTC device 100 moves to the U-Cell, as known with reference to FIGS. 13A, 13B, and 13C. Thereafter, the MTC device 100 may perform the general data transmitting and receiving process to and from the U-Cell.

Meanwhile, the cell-out announcement as 1 bit may be used to announce that the MTC device 100 switches the operating cell thereof to the correspond cell. Alternatively, the cell-in announcement may be constituted by a plurality of bits and represent various information. For example, the cell-in announcement of the plurality of bits may include an index of the MTC device. Further, the cell-in announcement of the plurality of bits may include the U-Plane reception period (U-RP). The U-RP may represent a period when the MTC device 100 operates while staying in the corresponding cell.

The U-RP which is the period when the MTC device 100 stays in the U-Cell may satisfy conditions described below.

- A value of the U-RP may be a value equal to or small than an interval in which the MTC device 100 needs to receive a synchronization signal of the C-Cell (alternatively, primary cell).
- The value of the U-RP may be a value equal to or small than an interval in which the MTC device 100 needs to receive the SIB of the C-Cell (alternatively, primary cell).
- The value of the U-RP may be a value equal to or small than an interval in which the MTC device 100 needs to receive the paging signal of the C-Cell (alternatively, primary cell).
- The value of the U-RP may be a value equal to or small than an interval in which the MTC device 100 needs to perform radio link monitoring (RLM) with the C-Cell (alternatively, primary cell).

The U-RP value may be a value which the MTC device 100 configures from the C-Cell. To this end, the MTC device 100 may configure the U-RP value from the C-Cell through the SIB, PDCCH, MAC message, or upper layer signal before switching the operating frequency to the U-Cell. Alternatively, the MTC device 100 may announce the U-RP value to the C-Cell. The MTC device 100 may announce the U-RP value to the C-Cell through the PUCCH, PUSCH, MAC message, or upper layer signal before switching the operating frequency to the U-Cell.

Alternatively, the U-RP value may be a value which the MTC device 100 configures. In this case, the MTC device may announce the U-RP value to the U-Cell through the PRACH, PUCCH, PUSCH, MAC message, or upper layer signal after switching the operating frequency to the U-Cell.

Alternatively, the U-RP value is configured by the C-Cell and the C-Cell may announce the U-RP value which the MTC device 100 will use to the U-Cell through a backhaul link (for example, X2 interface).

Alternatively, the U-RP value may be configured by the U-Cell. In this case, the MTC device 100 may configure the U-RP value from the U-Cell through the RAP, PDCCH, MAC message, or upper layer signal after switching the operating frequency to the U-Cell. Alternatively, the U-Cell may announce the U-RP value which the MTC device 100 will use to the C-Cell through the backhaul link (for example, X2 interface).

On the other hand, when the MTC device 100 completes transmission of uplink traffic in the U-Cell, the MTC device 100 may return to the C-Cell as known with reference to FIGS. 13A, 13B, and 13C.

Before returning to the C-Cell, the MTC device 100 may transmit the cell-out announcement to the U-Cell. In this case, the cell-out announcement may be constituted by 1 bit or the plurality of bits as described above. The cell-out announcement of the plurality of bits may include the U-Plane reception period (U-RP) or a C-plane reception period (C-RP).

Alternatively, as known with reference to FIG. 13C, when a designated period in the U-RP elapses, the MTC device 100 may automatically return to the C-Cell without transmitting the cell-out announcement.

The MTC device 100 which completes returning to the C-Cell may transmit the cell-in announcement to the C-Cell. The cell-in announcement may be constituted by 1 bit or the plurality of bits as described above. The cell-in announcement of the plurality of bits may include the C-Plane reception period (C-RP).

Figure 14:
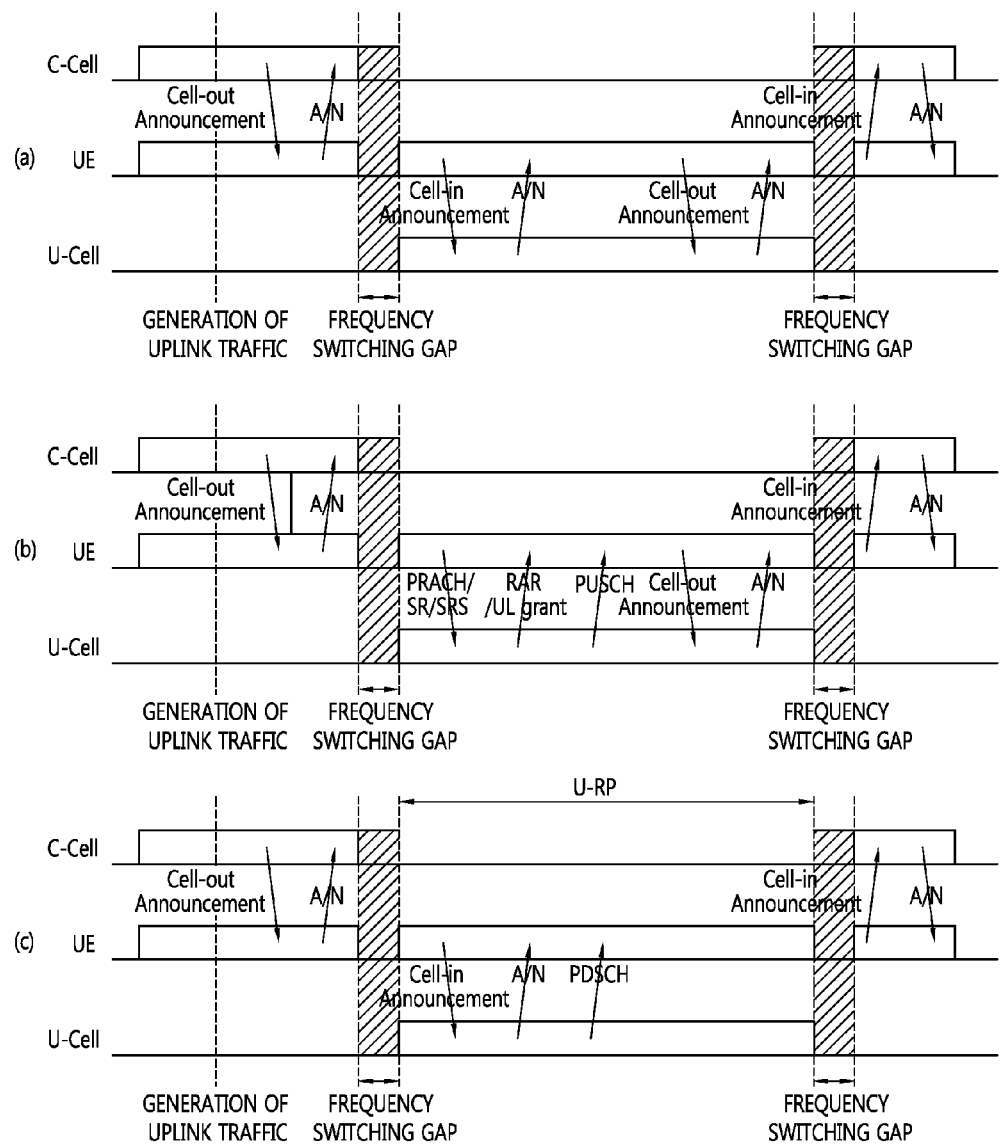
FIG. 14 illustrates a TDM scheme for uplink traffic transmission.
Figure 15:
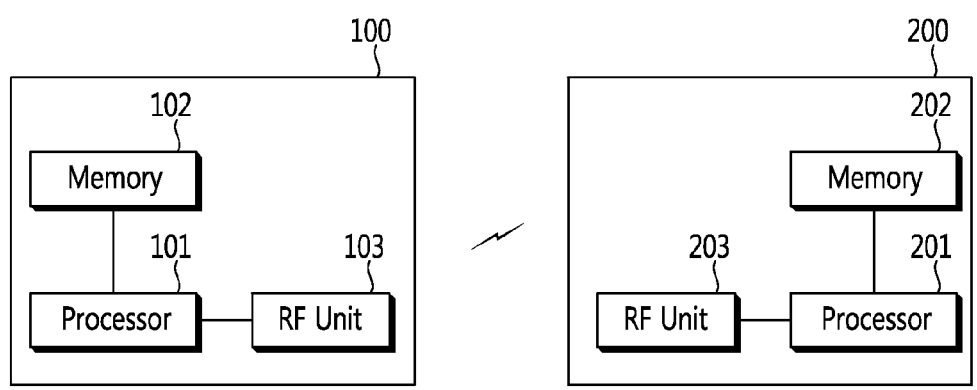
FIG. 15 is a block diagram illustrating a wireless communication system according to an embodiment of the present invention.

FIG. 14 Illustrates a TDM Scheme for Downlink Traffic Transmission.

As known with reference to FIGS. 14A, 14B, and 14C, when downlink traffic to be transmitted to the MTC device 100 is generated, the C-Cell may instruct the MTC device to switch the operating frequency thereof to the operating frequency of the U-Cell. The instruction may be, for example, a cell-out recommendation.

The cell-out recommendation may be transmitted to the MTC device through the PDCCH or PDSCH or transmitted to the MTC device through the MAC message or the upper layer signal.

The cell-out recommendation as 1 bit may be used for the MTC device 100 to just instruct the MTC device 100 to change the operating cell thereof. Alternatively, the cell-out recommendation may be constituted by the plurality of bits and represent various information. For example, the cell-out recommendation of the plurality of bits may include the carrier indicator. The carrier indicator may indicate the index of a carrier where the MTC device 100 will move. Further, the cell-out recommendation of the plurality of bits may include the U-Plane reception period (U-RP). The U-RP may represent a period when the MTC device 100 operates in the U-Cell by shifting the operating frequency. Herein, when a value of the carrier indicator indicates an index of a carrier where the MTC device 100 operates at present, the value may mean that the MTC device 100 intends to not shift the operating frequency. Similarly, when the value of the U-RP indicates 0, the value may mean that the MTC device 100 intends to not shift the operating frequency.

The MTC device 100 may receive an ACK for the cell-out recommendation and thereafter, shift the operating cell thereof to the U-Cell. In this case, when the MTC device 100 has the plurality of U-Cells, the MTC device 100 my shift the operating cell thereof to the U-Cell indicated in the carrier indicator of the cell-out recommendation.

Thereafter, the MTC device 100 may switch the operating frequency thereof to be suitable for the U-Cell during an illustrated frequency switching gap. In this case, the frequency switching gap may be shared by the MTC device 100 and the corresponding cell.

On the other hand, as known with reference to FIGS. 14A and 14C, the MTC device 100 may transmit the cell-in announcement to the U-Cell after moving to the U-Cell.

Alternatively, as known with reference to FIG. 14B, the cell-in announcement may be substituted with transmission of the PRACH, the scheduling request (SR), or the SRS.

On the other hand, when the MTC device 100 completes transmission of uplink traffic in the U-Cell, the MTC device 100 may return to the C-Cell as known with reference to FIGS. 14A, 14B, and 14C. As known with reference to FIGS. 14A and 14C, the MTC device 100 may transmit the cell-out announcement to the U-Cell after returning to the C-Cell.

The MTC device 100 which completes returning to the C-Cell may transmit the cell-in announcement to the C-Cell.

The aforementioned embodiments of the present invention can be implemented through various means. For example, the embodiments of the present invention can be implemented in hardware, firmware, software, combination of them, etc. Details thereof will be described with reference to the drawing.

[FIG. 8] 15 is a Block Diagram Illustrating a Wireless Communication System According to an Embodiment of the Present Invention.

The base station (BS) 200/300 includes processor 201/301, memory 202/302, and radio frequency (RF) unit 203/303. The memory 202/302 coupled with the processor 201/301 stores a variety of information for driving the processor 201/301. The RF unit 203/303 coupled to the processor 201/301 transmits and/or receive radio signals. The processor 201/301 implements the proposed functions, procedures, and/or methods. In the aforementioned embodiment, an operation of the BS may be implemented by the processor 201/301.

The MTC device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A transmission and reception method, the method performed by a wireless device and comprising:
   transmitting, by the wireless device having a connectivity with a first cell, a cell-out announcement to the first cell;
   switching from the connectivity with the first cell to connectivity with a second cell;
   transmitting a cell-in announcement to the second cell;
   receiving, from the second cell, a master information block (MIB) of the first cell;
   receiving, from the second cell, a primary synchronization signal (PSS) and a secondary synchronization signal (SSS) which are generated based on a cell identifier of the first cell by the second cell;
   transmitting and receiving the data in a state of connectivity with the second cell;
   transmitting a cell-out announcement to the second cell;
   transmitting a cell-in announcement to the first cell; and
   switching from the connectivity with the second cell to the connectivity with the first cell.

2. The method of claim 1, wherein the cell-out announcement is transmitted through a physical uplink control channel (PUCCH), a physical uplink shared channel (PUSCH), a medium access control (MAC) message, or an upper layer signal.

3. The method of claim 1, further comprising:
   receiving a cell-out recommendation from the first cell before switching from the connectivity with the first cell to the connectivity with the second cell for reception of downlink data.

4. The method of claim 3, wherein the cell-out recommendation is received through a physical downlink control channel (PDCCH), a physical downlink shared channel (PDSCH), the MAC message, or the upper layer signal.

5. The method of claim 1, wherein the cell-in announcement is transmitted through the PUCCH, the PUSCH, the MAC message, or the upper layer signal.

6. The method of claim 1, wherein the cell-in announcement is transmitted through a PRACH or a scheduling request (SR).

7. A machine type communication (MTC) device comprising:
   a transceiver that establishes a connectivity with a first cell; and
   a processor that:
      controls the transceiver to transmit a cell-out announcement to the first cell;
      switches from the connectivity with the first cell to connectivity with a second cell;
      controls the transceiver to transmit a cell-in announcement to the second cell;
      controls the transceiver to receive, from the second cell, a master information block (MIB) and a system information block (SIB) of the first cell;
      controls the transceiver to transmit and receive the data in a state of connectivity with the second cell; and
      controls the transceiver to transmit the cell-in announcement to the first cell; and
      switches from the connectivity with the second cell to the connectivity with the first cell.

8. The method of claim 3, wherein the cell-out recommendation comprises
   a target carrier index, to which the wireless device has to perform a frequency switch; and
   a time period when the wireless device has to operate after performing the frequency switch.

9. The method of claim 8, wherein if the target carrier index indicates a carrier index of which the wireless device currently uses, it is indicated the wireless device has not to perform the frequency switch.

10. The method of claim 8, wherein if the time period indicates a value of zero (0), it is indicated the wireless device has not to perform the frequency switch.

* * * * *